(12) United States Patent
Le et al.

(10) Patent No.: US 6,542,931 B1
(45) Date of Patent: Apr. 1, 2003

(54) USING SPARSE FEEDBACK TO INCREASE BANDWIDTH EFFICIENCY IN HIGH DELAY, LOW BANDWIDTH ENVIRONMENT

(75) Inventors: Khiem Le, Coppell, TX (US); Haihong Zheng, Coppell, TX (US); Zhigang Liu, Irving, TX (US); Christoph Clanton, Richardson, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/434,384

(22) Filed: Nov. 5, 1999

(51) Int. Cl.$^7$ .............................. G06F 15/16; H04L 9/00
(52) U.S. Cl. ................... 709/228; 709/217; 709/232; 709/247; 713/160; 714/750; 341/60
(58) Field of Search .............................. 714/749, 750; 709/227, 247, 217, 228, 232; 341/60; 713/160

(56) References Cited

U.S. PATENT DOCUMENTS

| | | | | |
|---|---|---|---|---|
| 4,797,881 A | * | 1/1989 | Ben-Artzi | 370/402 |
| 4,896,151 A | * | 1/1990 | Kuranami et al. | 714/748 |
| 5,528,605 A | * | 6/1996 | Ywoskus et al. | 370/507 |
| 5,684,791 A | | 11/1997 | Raychaudhuri et al. | |
| 5,872,777 A | | 2/1999 | Brailean et al. | |
| 5,970,063 A | * | 10/1999 | Chapman et al. | 370/346 |
| 6,032,197 A | * | 2/2000 | Birdwell et al. | 709/247 |

OTHER PUBLICATIONS

Wei, et al. "Improvement of TCP Performance on Asymmetric Channels Based on Enhancements of Compressing TCP/IP Header Algorithm", International Conference on Communication Technology (ICCT '98), Oct. 22–24, 1998, Beijing, China.*

W. Zwaenepoel, "Protocol for Large Data Transfers over Local Networks" Proceedings of the Data Communications Symposium, U.S. Washington, IEEE Computer Society Press, vol. SYM. 9, Sep. 1, 1985, pp. 22–32.

S. Bakhtiyari et al, "A Robust Type II Hybrid ARQ Scheme with Code Combining for Mobile Communications" Proceedings of the Pacific RIM Conference on Communications, Computers and Signal Processing, May 19, 1993, pp. 214–217.

* cited by examiner

*Primary Examiner*—David Wiley
*Assistant Examiner*—George C Neurauter
(74) *Attorney, Agent, or Firm*—Antonelli, Terry, Stout & Kraus, LLP

(57) ABSTRACT

A method and apparatus for eliminating the inefficient use of network bandwidth cause by numerous acknowledgment transmitted by the receiver to the transmitter by providing sparse feedback from the receiver to the transmitter indicating receipt of packets having headers to be used as reference headers. In the invention, upon receipt in the receiver of a packet having a reference header, a feedback is provided to the transmitter indicating receipt of the packet having the reference header. Thereafter, the receiver waits a predetermined period of time before providing another feedback in response to another packet having a reference header. The predetermined period of time allows time for the feedback to be received by the transmitter and for information from the transmitter indicating receipt of the feedback to be received by the receiver.

10 Claims, 4 Drawing Sheets

USING SPARSE FEEDBACK TO INCREASE BANDWIDTH EFFICIENCY IN HIGH DELAY, LOW BANDWIDTH ENVIRONMENT

BACKGROUND OF THE INVENTION

The present invention relates to a method and apparatus for eliminating the inefficient use of network bandwidth caused by numerous acknowledgements transmitted by a receiver to a transmitter by providing sparse feedback from the receiver to the transmitter to indicate receipt of packets having headers to be used as reference headers.

For Internet Protocol (IP) based real-time multimedia applications packets are used to carry the real-time data. Each packet includes a header and a payload. The header carries information such as source and destination addresses of the packet and the payload carries the data to be transmitted. Each packet is formatted according to the IP and Real-time Transfer Protocol (RTP) which is predominately used on top of User Datagram Protocol (UDP). RTP is described in detail in "RTP: A Transport Protocol for Real-Time Applications" by H. Schulzrinne, et al, Internet Engineering Task Force (IETF) Request for Comments (RFC) 1889, January 1996. The size of a combined IP/UDP/RTP header for a packet is at least 40 bytes for IPv4 and at least 60 bytes for IPv6. A total of 40–60 bytes of overhead per packet may be considered heavy in systems (e.g., such as cellular networks) where spectral efficiency is a common concern. Consequently, a need arises for suitable IP/UDP/RTP header compression mechanisms.

A current header compression scheme is described in "Compressing IP/UDP/RTP Headers for Low-Speed Serial Links" by S. Casner et al, IETF, RFC 2508, February 1999 and "IP Header Compression" by M. Degermark, et al, IETF, RFC 2507, February 1999. The header compression scheme described in RFC 2508 is able to compress the 40-60 bytes IP/UDP/RTP header down to 2 or 4 bytes over point-to-point links. This header compression scheme is based on the observation that most fields of the headers of the packets remain constant in a packet stream during the length of a session. Thus, it is possible to compress the header information by establishing a compression state (context) at a compressor (transmitter) and a decompressor (receiver). Packets having compressed headers are then transmitted from the compressor to the decompressor, wherein the compressed headers correspond to a reference header stored as part of the compression state. Each compressed header contains a minimum amount of information. The information carried in the compressed header is decompressed at the decompressor based on the established compression state.

In RFC 2508 the changes occurring in the RTP header fields from one packet to the next, such as the RTP time stamp, can be predicted by linear extrapolation from the preceding header which was received without error. Thus, in an RTP header the primary information that is sent is a sequence number which is used for packet loss detection. To initiate a session or to re-synchronize a compression state between a compressor and decompressor, a packet containing a Full Header (FH) is transmitted from the compressor to the decompressor. The FH contains all of the information of the header of the packet and is used (stored) as a reference header. After a session has been initialized or re-synchronization has been performed, all subsequent packets are transmitted with compressed headers. The compressed headers are, for example, of two types.

The first type of compressed header is used when the subsequent headers of the subsequently transmitted packets can be extrapolated in a linear fashion from the previous header. In this setting, the compressor transmits sequence numbers as the compressed headers. This type of compressed header is referred to as Second Order (SO) header. The second type of compressed header is used when the subsequent headers of the subsequently transmitted packets cannot be extrapolated in a linear fashion. In this setting, the compressor transmits additional information including the sequence number as the compressed headers. This type of compressed header is referred to as a First Order (FO) header. The FO header contains additional information which is required to accurately decompress the compressed headers of the subsequently transmitted packets. In RFC 2508, all headers that are decompressed are stored as reference headers. In order to decompress the current header, the decompressor must have correctly decompressed the previous header. In practice, it is not uncommon for packets having compressed header to be lost or corrupted during transmission. This results in the compressor and decompressor staying in a less then optimal state for some extended time. The same can occur due to Round Trip delays in receiving the packets having compressed headers. Consequently, the data streams being processed by the compressor and decompressor may require additional bandwidth.

To improve the header compression scheme described in RFC 2508, the decompressor transmits acknowledgements to the compressor indicating receipt of a FH or FO header packet. The compressor in response to an acknowledgement indicating receipt of a FH packet switches to an FO state and begins transmitting FO header packets where linear extrapolation cannot be conducted or switches to the SO state and begins transmitting SO header packets where linear extrapolation can be conducted. Similar to an FH packet the compressor, in response to an acknowledgment indicating receipt of an FO header packet, switches to the SO state and begins transmitting SO header packets.

In error/loss prone communication environments, such as cellular, the decompressor cannot be certain that the acknowledgment has been properly received by the compressor until it sees an altered behavior on the part of the compressor. Namely, the decompressor in conventional apparatus is not aware that the acknowledgment has been properly received, until it sees that the compressor has altered its behavior. That is, the decompressor sees FO header packets instead of FH packets or SO header packets instead of FO header packets. In the mean time, the decompressor keeps sending acknowledgments to headers of each of the packets received. Further, the decompressor in conventional apparatus remains unaware that the acknowledgment has been properly received due to round trip delays in receiving packets resulting rom the altered behavior of the compressor. Thus, the conventional technique suffers from the disadvantage of inefficient use of bandwidth of the network.

FIG. 1 graphically illustrates the inefficient use of the bandwidth of a network resulting from sending acknowledgments in response to each and every FH packet or FO header packet even after a first acknowledgment has been sent. According to the above, as each FH packet or FO header packet is received an acknowledgment is transmitted from the decompressor to the compressor acknowledging receipt of the FH packet or FO header packet. In FIG. 1, it is assumed that at time $t_0$ an FO(n) header packet is transmitted from the compressor and detected by the decompressor at time $t_1$. Further, at time $t_1$ the decompressor, in response to the FO(n) header packet transmits an acknowledgment (ACK(n)) to the compressor. In FIG. 1 it is assumed that $T_{dd}$ is the transmission delay from the decompressor to the compressor, $T_{du}$ is the transmission delay from the compressor to the decompressor, $T_{samp}$ is the time interval between consecutive media samples inserted into the packet, ACK (n) is an acknowledgment transmitted from the decompressor upon receiving an FH packet or an FO(n) header packet, and $SO(_n+T_{dd}+T_{du})/T_{samp})$ is an SO header packet sent by the compressor in response to receipt of the ACK(n)

According to FIG. 1, from time $t_0$ forward, the compressor continues sending FO header packets through time $t_1$ until the ACK(n) has been received at the compressor at time $t_2$. The decompressor, in response to each FO header packet transmitted subsequent to the FO(n) header packet, transmits an ACK to the compressor. At time $t_2$, once the ACK(n) has been received, the compressor begins transmitting SO header packets to the decompressor. At a time subsequent to time $t_2$ the decompressor receives the first one of the SO header packets, thereby indicating that the ACK(n) was properly received at the compressor. The decompressor then stops transmitting ACK's to the compressor.

Thus, as is clearly illustrated in FIG. 1 in the time between time $t_0$ and $t_2$, FO header packets are still being sent from the compressor, and the decompressor in response to each of these FO header packets sends an ACK, thereby occupying precious bandwidth in the network. Therefore, the conventional technique causes inefficient use of the bandwidth of a network.

SUMMARY OF THE INVENTION

The present invention provides a method and apparatus for eliminating the inefficient use of network bandwidth caused by numerous acknowledgments transmitted by the receiver to the transmitter by providing sparse feedback from the receiver to the transmitter to indicate receipt of packets having headers to be used as reference headers.

The present invention is applicable to a network system where spectral efficiency is a concern. The present invention can also be applied where the compression of the headers of packets which are transmitted in a network system would provide some efficiencies in the use of the bandwidth of the network system. In such a network system, a compression state is established on a link or communication channel between a transmitter (compressor) and receiver (decompressor) so that packets transmitted between the compressor and decompressor on the link or communication channel are sent with compressed headers. The compression state is established by storing information corresponding to information contained in the header of a packet as a context in both the compressor and decompressor, when the header is to be used as a reference header. The compressor and decompressor can, for example, each be separate apparatus provided in the network system or provided as a part of, for example, a router, a host, a terminal or any other such apparatus included in the network system.

In the present invention, a packet having the header to be used as a reference header is transmitted from the transmitter to the receiver. Such a packet can, for example, be a FH packet or a FO packet. According to the present invention, the receiver receives the packet having the reference header and in response provides a feedback to the transmitter indicating receipt of the packet having the reference header. After providing the feedback, the receiver waits a predetermined period of time before providing another feedback in response to another packet having a reference header transmitted by the transmitter.

The predetermined period of time the receiver waits before providing another feedback allows for receipt of information from the transmitter indicating that the transmitter has received the feedback. The predetermined period of time could, for example, correspond to the Round Trip Time of a packet sent from the receiver to the transmitter and back.

The information returned by the transmitter to the receiver in response to the feedback could, for example, be information indicating that the transmitter has altered its behavior. Specifically, the information could, for example, be a packet having a compressed header which corresponds to the reference header. Such a packet can, for example, be a SO header.

BRIEF DESCRIPTION OF THE DRAWINGS

The present invention will be more apparent from the following detailed description, when taken in conjunction with the accompanying drawings, in which.

DESCRIPTION OF THE INVENTION

Figure 2:
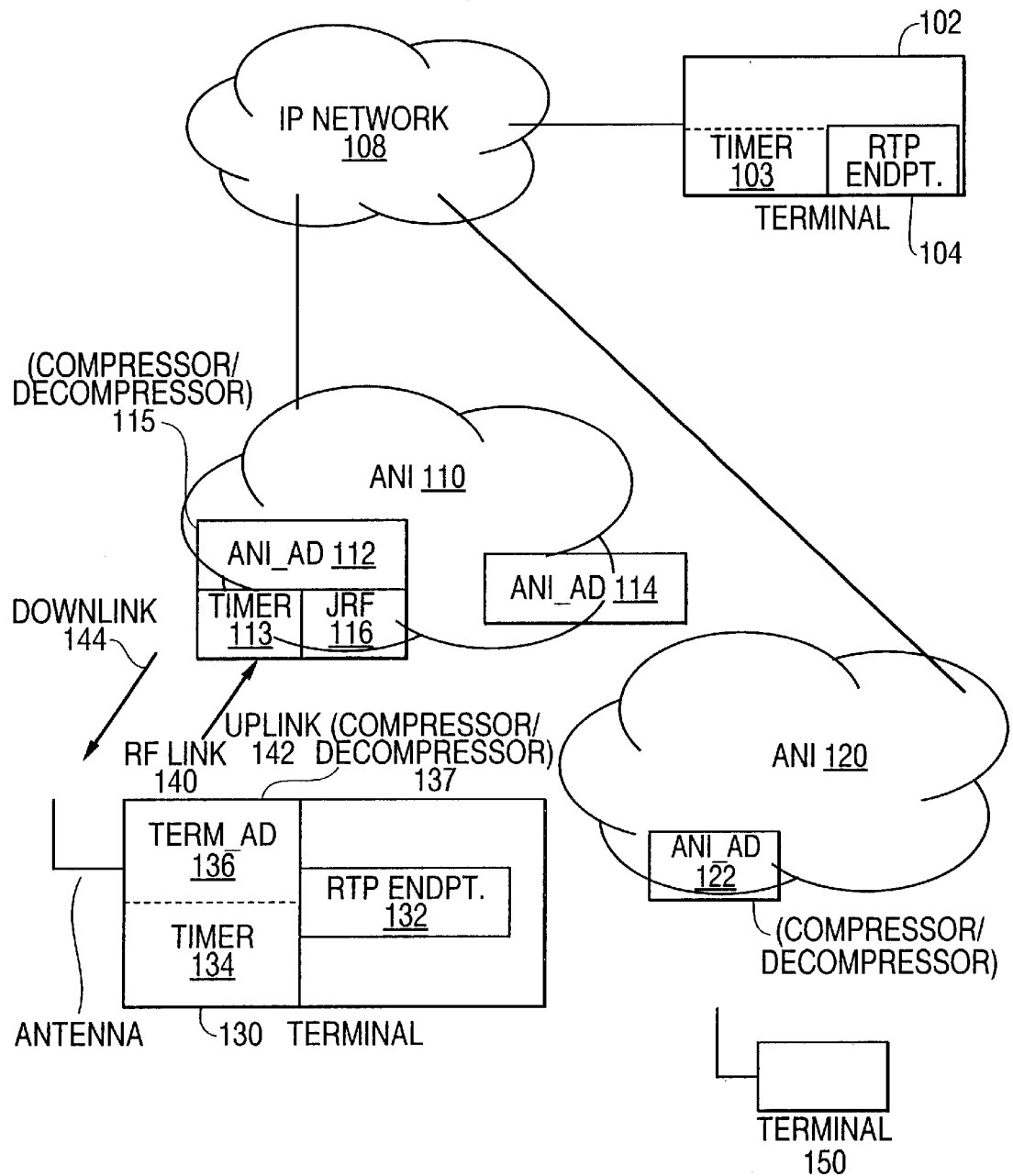
FIG. 2 illustrates an example of a network system architecture in accordance with the present invention.
Figure 3:
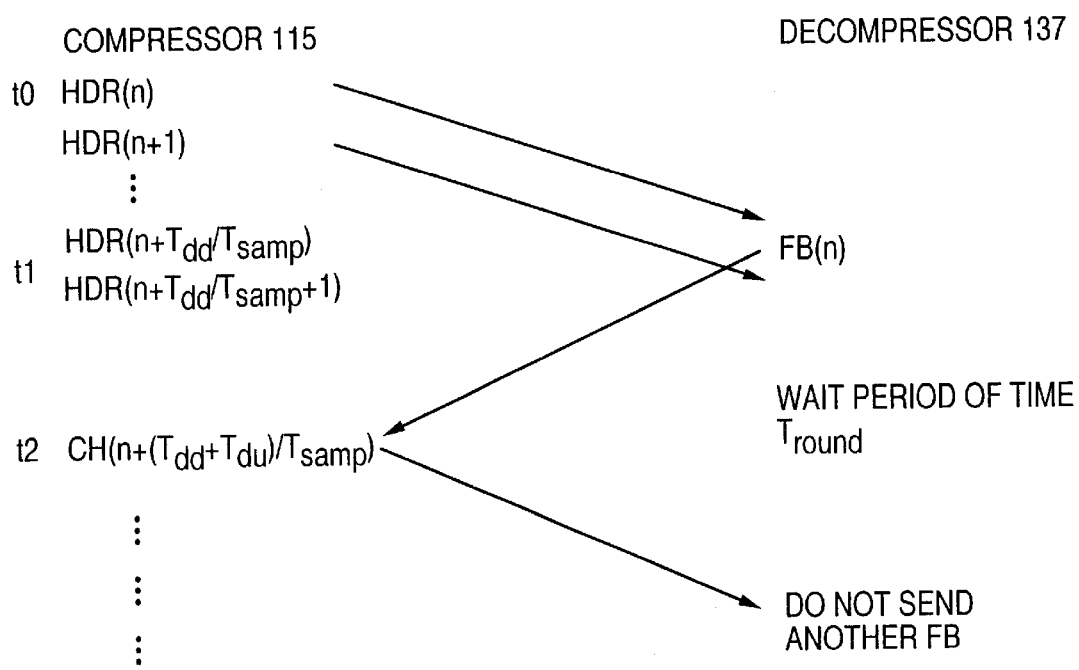
FIG. 3 illustrates the efficient use of the bandwidth of a network system according to the technique of the present invention.
Figure 4:
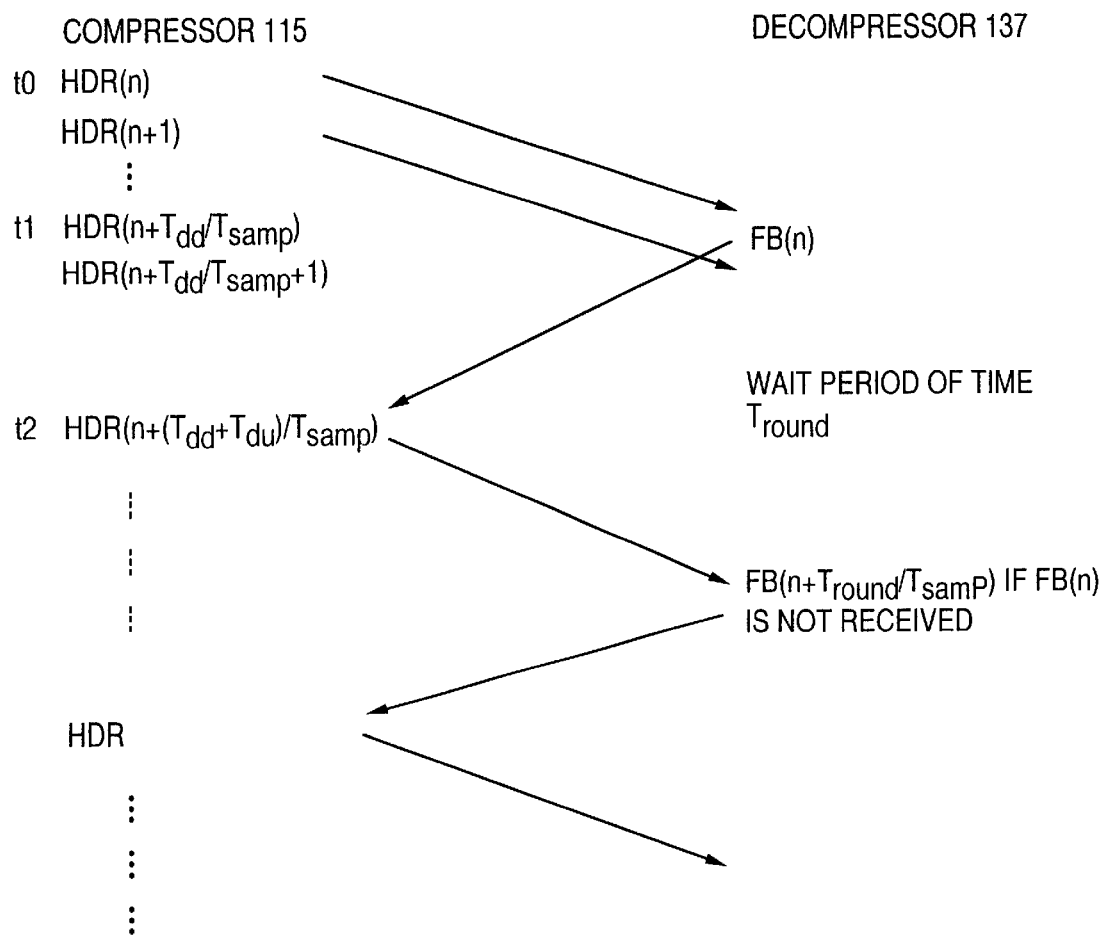
FIG. 4 illustrates the efficient use of the bandwidth of a network system according to the technique of the present invention.

The features of present invention are illustrated for example, in FIGS. 2–4. However, it should be understood that the present invention is not limited thereto and can be implemented in other architectures. The present invention is described below as being applicable to a system whereby a compressor and a decompressor is used so as to transmit packets having compressor headers. However, the present invention can be applied to any system where bandwidth requires conservation and a reduction in the number of acknowledgments transmitted from a receiver to a transmitter would improve bandwidth efficiently.

The network system of the present invention as illustrated in FIG. 2 provides a terminal 102 which is connected to an IP network 108. The terminal 102 can, for example, be a personal computer, telephony apparatus, host, laptop or any other such apparatus which executes processing in accordance with IP/RTP/UDP. Particularly, the terminal 102 can provide packets of voice samples which are formatted according to RTP for transmission over the IP network 108. In order to accomplish this, the terminal 102 includes an RTP endpoint 104 which identifies terminal 102 (e.g., including IP address, port number, etc) as either a source and destination of RTP packets. While the IP network is provided as an example, other types of packet switched networks can be used in place thereof. Terminal 102 also includes a local timer 103 for generating a time stamp.

An Access Network Infrastructure (ANI) 110 is connected to the IP network 108. A wireless terminal 130 is coupled via a Radio Frequency (RF) link 140 to the ANI 110. The RF link 140 includes a up-link 142 which transmits data from the terminal 130 to the ANI 110 and a down-link 144 which transmits data from the ANI 110 to the terminal 130. ANI 110 interfaces one or more wireless or RF terminals including terminal 130 located in different areas of a region to IP network 108. ANI 110 performs functions such as converting between wireline signals provided by the IP network 108 and wireless or RF signals provided by terminals such as terminal 130. Thus, ANI 110 allows RTP packets received from the IP network 108 to be sent over RF link 140 to terminal 130 and allows RTP packets received from, for example, terminal 130 to be sent over the IP network 108 to, for example, terminal 102.

According to the present invention, ANI 110 includes one or more ANI adapters (ANI_AD) such as ANI_AD 112 and ANI_AD 114. Each of the ANI-AD's includes a timer 113 and performs header compression on RTP packets prior to transmitting the packets on the down-link 144 to terminal 130 and performs header decompression on RTP packets after being transmitted on the up-link 142 from terminal 130. The header of each packet includes one or more fields such as a time stamp field. The header of each packet recieved from the IP network 108 is compressed according to RFC 2508 by ANI-AD 112 prior to transmission to terminal 130 on down-link 144. The header of each packet received from the terminal 130 over the up-link 142 is decompressed according to RFC 2508 by ANI_AD 112 before transmission to IP network 108. Therefore, each ANI_AD serve as a compressor and/or a decompressor (compressor/decompressor 115). Thus, the compression/decompression function according to RFC 2508 can be implemented in any of the apparatuses included in the system (e.g., routers, hosts, telephony apparatuses, etc.).

Each ANI_AD interfaces terminals located in a specific area within a region to the IP network 108 and makes use of the timer 113 for implementing a timer-based compression/decompression techniques. ANI_AD 112 also includes a jitter reduction function (JRF) 116 which operates to measure the jitter on packets (or headers) received over the IP network 108 and discard any packets/headers having excessive jitter. Additional ANI's such as ANI 120 are, for example, provided for interfacing other terminals located in other areas of other regions to the IP network 108. ANI 120 similarly includes one or more ANI_AD's such as ANI_AD 122 which includes at least a timer and a JRF as described above.

Terminal 130 includes an RTP endpoint 132 which identifies terminal 130 (e.g., including IP address, port number, etc) as a source and/or destination of RTP packets. Terminal 130 also includes a terminal adapter (TERM_AD) 136 which performs header compression on the headers of packets to be transmitted over the up-link 142 and header decompression on the headers of packets received over the down-link 144. Thus, TERM_AD 136 serves as a compressor or a decompressor (compressor/decompressor 137) similar to ANI_AD. TERM_AD 136 includes a timer 134 for calculating an approximation of a RTP time stamp of a current header and to measure elapsed time between successively received packets.

The configuration illustrated in FIG. 2 is an example of a system in which the present invention is practiced wherein RTP packets are transmitted over a link or communication channel such as the wireless link 140 where bandwidth is at a premium and errors are not uncommon. However, the present invention is not limited to a wireless link but may in fact be applicable to a wide variety of links or communication channels including wireline links. The present invention may, for example, find application in packets which are used for voice over IP network or IP telephony.

In order to illustrate the features of the present invention as it relates to FIG. 2 the following assumptions are made. Data, including, for example, voice, in the form of packets are transmitted from terminal 102 through the IP network 108 to the terminal 130 via ANI 110, ANI_AD 112 and the down-link 144. In order to conserve the bandwidth of the down-link 144, the headers of each of the packets transmitted from the terminal 102 are compressed by the compressor/decompressor 115 which form part of ANI_AD 112. The packets having the compressed headers are transmitted by the compressor/decompressor 115 over the down-link 144 to the terminal 130. The terminal 130 including a compressor/decompressor 137 decompresses the headers of the packets transmitted over the down-link 144 to obtain the original packets. The original packets are then processed by the terminal 130.

In order to initiate a session between the compressor/decompressor 115 and the compressor/decompressor 137 or re-synchronize a compression a state between the compressor/decompressor 115 serving as a compressor and the compressor/decompressor 137 serving as a decompressor, a packet containing a reference header such as Full Header (FH) or a First Order (FO) header is transmitted from the compressor 115 to the decompressor 137. The FH or FO header contains information corresponding to the fields of a header of a packet. Such information is stored as a reference header (context) in the compressor 115 and the decompressor 137. After a session has been initialized or re-synchronization has been performed, all subsequent packets to be transmitted from the compressor 115 to the decompressor 137 are transmitted with compressed headers. The compressed headers can, for example, be of two types. The first type of compressed header is used when the headers of the subsequently transmitted packets can be extrapolated in a linear fashion from the reference header. This type of compressed header is referred to a as a Second Order (SO) header. The FO header is the second type of compressed header. The FO header is used when the headers of the subsequently transmitted packets cannot be extrapolated in a linear fashion. As per the above, both the FH and the FO headers are used as reference headers.

Upon receipt of either an FH packet or an FO packet the decompressor 137 provides a feedback to the compressor 115 indicating receipt of the FH packet or the FO packet. It should be noted that the compressor 115 continues to send FH packets or FO header packets until a feedback from the decompressor 137 has been received indicating proper receipt of the FH packet or the FO header packet. The feedback from the decompressor 137 is sent to the compressor 115 over the up-link 142.

In the conventional technique, an acknowledgment is sent by the decompressor 137 in response to each and every FH packet or the FO header packet which are continually sent by the compressor 115. Thus, the conventional technique inefficiently uses the bandwidth of the up-link 142.

The present invention conserves the bandwidth in the up-link 142 by causing the decompressor 137 to send a feedback in response to a FH packet or a FO header packet and then wait a predetermined period of time before sending another feedback in response to FH packets or FO header packets which are continually being transmitted by the compressor 115. Thus, the decompressor 137 transmits one feedback over the up-link 142 in response to the FH packet or the FO header packet and waits for an indication from the compressor 115 that the feedback has been received. If after the predetermined period of time has expired, an indication that the compressor 115 received the feedback has not been received then the decompressor 137 sends another feedback in response to a subsequently transmitted FH packet or FO header packet.

The predetermined period of time during which the decompressor 137 waits before sending another feedback in response to a subsequently transmitted FH packet or FO header packet, allows time for the feedback to traverse the up-link 142 to the compressor 115 and time for the indication of receipt of the feedback by the compressor 115 to traverse the down-link 144 back to the decompressor. The predetermined period of time could, for example, correspond to the Round-Rrip-Time (RTT) it would take for a packet transmitted from the decompressor 137 to the compressor 115 over the up-link 142 and for the packet to be returned back to the decompressor 137 over the down-link 144. The information from the compressor 115 indicating that the compressor has received the feedback could be information indicating that the compressor 115 has altered its behavior by, for example, sending SO header packets.

The basic feature of the invention is that it is more likely than not that the feedback transmitted by the decompressor 137 to the compressor 115 will properly traverse the link between the decompressor 137 and compressor 115 so as to cause the compressor 115 to alter its behavior. Since it is more likely than not for the feedback to properly traverse the link between the decompresssor 137 and the compressor 115, then it would be on rare occasions that the feedback is not received by the compressor 115. When such occurs, the decompressor re-transmits another feedback in response to a subsequently transmitted FH packet or the FO header packet.

Figure 1:
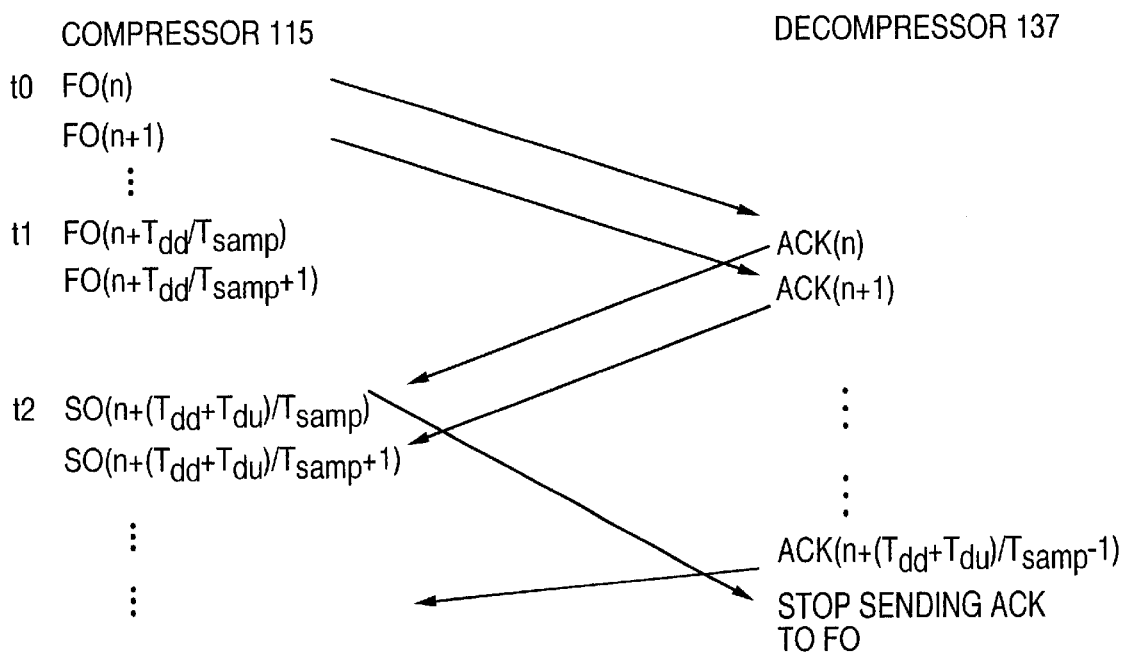
FIG. 1 illustrates the inefficient use of the bandwidth of a network system according to the conventional technique.

The technique of the present invention is particularly illustrated in FIG. 3. In FIG. 3, similar to FIG. 1, where $T_{dd}$ is the transmission delay from the decompresssor 137 to the compressor 115, $T_{du}$ is the transmission delay from the compressor to the decompresssor 137, $T_{samp}$ is the time interval between consecutive media samples, HDR(n) is a packet having a header that can be used as a reference header (FH or FO header) transmitted from the compressor 115 with a sequence number n, FB(n) is a feedback sent from the decompresssor 137 to the compressor 115 upon receiving a packet with the header HDR(n), $T_{round}$ is the round-trip delay for a packet to traverse the link between the decompressor 137 and compressor 115 and back, where $T_{round}$ equals $T_{dd}+T_{du}$, CH and is a packet having a compressed header that may be of the FO less optimal state or the SO more optimal state.

As illustrated in FIG. 3, at time to the compressor 115 transmits a packet having a header HDR(n) to the decompresssor 137. At time $t_1$ the decompressor 137 detects the packet having the header HDR(n) and in response transmits the feedback FB(n) to the compressor 115. In the meantime, the compressor 115 continues to transmit packets having the header HDR through time $t_1$. The decompresssor 137 after transmitting the feedback FB(n) to the compressor 115 waits a predetermined period of time corresponding to, for example, $T_{round}$. In other words, the decompresssor 137 does not send another feedback to any further packets having the header HDR until the time $T_{round}$ has elapsed.

Once the compressor 115 receives the feedback FB(n) at time $t_2$, the compressor 115 alters its behavior and begins sending packets having compressed headers CH(n+$T_{dd}$+$T_{du}$)/$T_{samp}$) The decompresssor 137 receives the CH(n+$T_{dd}$+$T_{du}$)/$T_{samp}$) packets having the compressed headers from the compressor 115, thereby indicating that the feedback FB(n) was properly received by the compressor 115.

FIG. 4 illustrates a situation according to the present invention where the feedback FB(n) was lost due to, for example, a link layer error. In such a situation, the decompresssor 137 waits until the predetermined period of time has elapsed and then determines that no information or indication has been transmitted from the compressor 115 that the feedback FB(n) has been received. The decompresssor 137 then transmits another feedback FB to the compressor 115 in response to a subsequently transmitted packet having a header HDR and waits for another predetermined period of time. Of course, if the compressor 115 does not transmit an indication that the re-transmitted feedback FB has been received, then at the very least the compressor 115 and decompressor 137 would remain in a less optimal state. The less optimal state is where packets having headers which are to be used as reference headers (FH or FO) are transmitted.

Even where an indication of receipt of the feedback has not been received, the present invention offers advantages being that there still is a reduced number of feedback transmitted from the decompressor 137 to the compressor 115 relative to the number of acknowledgements that would be transmitted according to the conventional technique. According to the present invention, subsequent feedbacks are only sent after the predetermined period of time has elapsed. Thus, the present invention provides for a sparse number of feedbacks to be transmitted from the decompressor 137 to the compressor 115.

According to the above, the present invention provides a method and apparatus for eliminating the inefficient use of network bandwidth caused by numerous acknowledgments transmitted by a receiver to a transmitter. The present invention accomplishes this by providing sparse feedback from the receiver to the transmitter to indicate receipt of packets having headers to be used as reference header. More particularly, the present invention upon receipt in the receiver of a packet having a reference header, provides a feedback to the transmitter indicating receipt of the packet having the reference header. The receiver then waits a predetermined period of time before providing another feedback in response to another packet having a reference header. This period of time allows for the feedback to traverse the link between the receiver and information indicating that the transmitter received the feedback to traverse the link between the transmitter an the receiver. Thus, the present invention makes for efficient use of the bandwidth of a network by providing a sparse number of feedbacks to a transmitter acknowledging receipt of a packet having, for example, a reference header.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. In a system having a transmitter which transmits a plurality of packets to a receiver, each of the packets containing a header, a method of providing sparse feedback from the receiver to the transmitter indicating receipt of a packet having a header to be used as reference header, comprising:

transmitting from the transmitter to the receiver a packet having a header to be used as a reference header;

receiving in the receiver said packet having the reference header and in response providing feedback from the receiver to the transmitter indicating receipt of said packet having the reference header; and waiting a predetermined period of time before providing another feedback in response to another packet having the reference header to permit receipt of information in the receiver indicating that the transmitter received said feedback, wherein said information received in the receiver includes information transmitted by the transmitter indicating that the transmitter has altered its behavior based on receipt of said feedback.

2. The method according to claim 1, wherein said information transmitted by the transmitter is a packet having a compressed header which is related to said reference header.

3. The method according to claim 2, wherein said reference header is a full header (FH) or a first order (FO) header.

4. The method according to claim 3, wherein said information transmitted by the transmitter to the receiver indicating its altered behavior is one of a FO header when said reference header is a FH, and a second order (SO) header when said reference header is said FH or said FO header.

5. The method according to claim 4, wherein the altered behavior of the transmitter includes one of switching from a FH state to a FO state and initiating transmission of packets each having a FO header, and switching from either a FH state or an FO state to a SO state and initiating transmission of packets each having a SO header.

6. The method according to claim 1, wherein said predetermined period of time is a round trip time (RTT) representing a time it takes for a packet to be transmitted from the receiver to the transmitter and for the packet to be returned by the transmitter back to the receiver.

7. The method according to claim 2, wherein said predetermined period of time is a round trip time (RTT) representing a time it takes for a packet to be transmitted from the receiver to the transmitter and for the packet to be returned by the transmitter back to the receiver.

8. The method according to claim 3, wherein said predetermined period of time is a round trip time (RTT) representing a time it takes for a packet to be transmitted from the receiver to the transmitter and for the packet to be returned by the transmitter back to the receiver.

9. The method according to claim 4, wherein said predetermined period of time is a round trip time (RTT) representing a time it takes for a packet to be transmitted from the receiver to the transmitter and for the packet to be returned by the transmitter back to the receiver.

10. The method according to claim 5, wherein said predetermined period of time is a round trip time (RTT) representing a time it takes for a packet to be transmitted from the receiver to the transmitter and for the packet to be returned by the transmitter back to the receiver.

* * * * *